Dec. 22, 1964  N. BUCHNER  3,162,564
HEAT SEALING APPARATUS
Filed Sept. 6, 1961

United States Patent Office 3,162,564
Patented Dec. 22, 1964

3,162,564
HEAT SEALING APPARATUS
Norbert Buchner, Hegnach, Waiblingen, Wurttemberg, Germany, assignor to Firma Fr. Hesser Maschinenfabrik-Aktiengesellschaft, Stuttgart-Bad Cannstatt, Germany, a corporation of Germany
Filed Sept. 6, 1961, Ser. No. 136,348
Claims priority, application Germany Sept. 7, 1960
7 Claims. (Cl. 156—498)

The present invention relates to a heat sealing apparatus with at least one sealing jaw for welding heat sealable packaging materials or the like.

In the majority of instances, use is made of permanently heated, metallic sealing jaws, capable of relative movement in pincers fashion, for the welding of heat-sealable packaging materials. These jaws are well suited to the sealing of packaging materials which consist of a carrier layer and a heat sealable coating. However, in the case of thermoplastic foils of polyethylene or like polymer plastics, it is found that when the sealing jaws are withdrawn from the seam, after this has been formed by heating up the foils to the fusion temperature at the intended location of the seam, very frequently parts of the material remain adhered to the heating surfaces of the jaws.

To prevent this happening, it has previously been proposed to apply to the sealing jaws coverings or strips of tetrafluoroethylene or the like, which detach very successfully from the heated foils. The strength and sealing qualities of seams produced by this device, however, leave something to be desired. This arises from the fact that the pressure exerted on the seam by the sealing jaws is interrupted at the moment the foils are in melted condition at the seam and are just about to fuse together. The removal of the pressure of the jaws means that the foils at the seam may partially part from one another in consequence of the heat expansion of the material, thereby leaving bubbles and imperfectly-sealed areas in the seam.

An apparatus has also been developed to hold the sealing seams under pressure until they have set, and in this apparatus heating bands are fastened to the sealing jaws and these are temporarily heated up by a powerful impulse of electrical current. By this means the foils are brought into the fused condition, united and set whilst still under the pressure of the sealing jaws which then cool down.

Sealing seams produced by this apparatus are found to exhibit fine cracks at their "roots," that is to say at their marginal zones, and these cracks impair the sealing effect of the finished package. This shortcoming is attributable to the fact that, during the heating-up of the heating bands, a temperature is set up which, having regard to the short time for sealing, must considerably exceed the melting temperature of the foils to achieve the required transfer of heat. The temperature differences thus occurring at the marginal zones of the seam produce stresses and cracks in the roots of the seams, as would similarly be to case with metals.

It is an object of this invention to furnish a heat sealing apparatus which avoids these short-comings.

With this the aim, we present a heat sealing apparatus having at least one heat sealing jaw which is equipped with continuously-operating heating means and is associated with a work-clamping jaw movable relatively to the heat sealing jaw; the arrangement is devised so that the clamping jaw will clamp the work (the thermoplastic sheet material) when the sealing jaw is pressed against this work, with an interposed sheet of tetrafluoroethylene or like material which is non-adherent to the hot plastic, and will remain in this clamping position during the initial part of the retraction of the sealing jaw.

In implementatoin of this arrangement we have devised a form of pincers organisation of the clamping jaw and the sealing jaw, and have arranged that the clamping jaw shall engage the work adjacent the sealing jaw, preferably at the two sides of the latter, and shall be retractable by this sealing jaw as the latter opens, but with a time lag, by an appropriate coupling.

In a preferred arrangement the clamping jaw has a slot into which the sealing jaw can project, and the tetrafluoroethylene or the like is anchored to the clamping jaw over this slot at the work side.

A very handy form of the apparatus uses at least one pair of sealing jaws arranged to engage the work pincersfashion, and a corresponding pair of clamping jaws; these two pincers systems may have a common pivot fulcrum, thus simplifying, inter alia, the requisite lost-motion coupling between associated jaws.

To accelerate the cooling of the sealing seam, in accordance with the further feature of the invention, there is arranged, on each clamping jaw, at least one nozzle which is automatically controlled by the relative motion between the corresponding sealing jaw and this clamping jaw to blow cooling air against the seam after the sealing jaw has been retracted.

The advantage of the apparatus according to the invention lies particularly in the fact that, on the one hand the heating of the sealing jaw or jaws can be effected by an electrical continuous heating means, and thus in simple fashion, and on the other hand advantage is taken of the impulsive heating without the drawbacks which have been described above having to be taken into account.

An example of embodiment of the subject of the invention is described below with reference to the accompanying drawings, in which.

Figure 1:
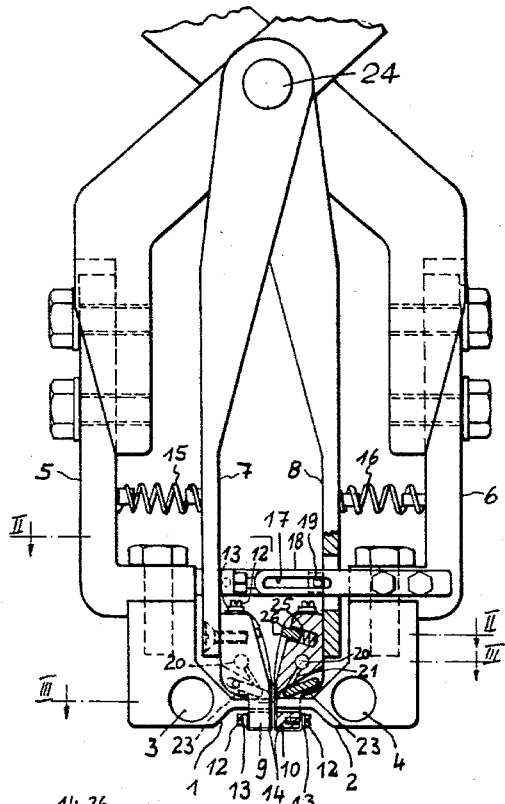
FIGURE 1 is a side view of the apparatus, partly in section.
Figure 2:
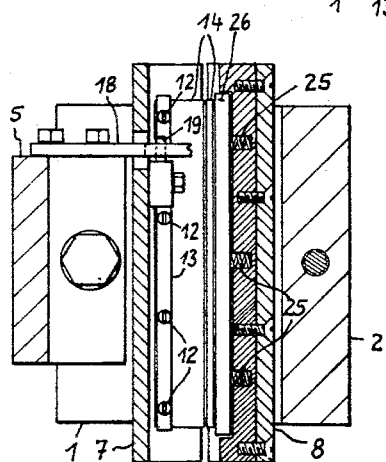
FIGURE 2 is a section through the apparatus on the line II—II of FIGURE 1.
Figure 3:
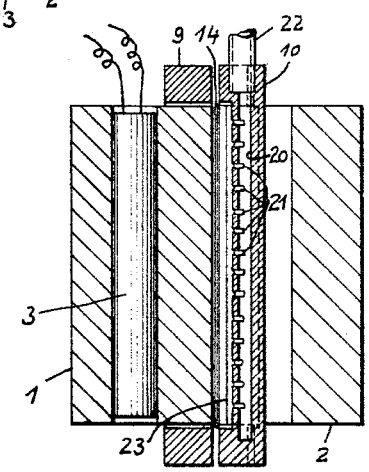
FIGURE 3 is also a section through this apparatus, but on the line III—III of FIGURE 1.

The apparatus illustrated is assumed to be used for the closure of bags of thermoplastic sheeting by welding them at the mouth, inside against inside, by means of sealing jaws 1, 2. Each of the sealing jaws 1, 2 is heated, by means of a built-in electrical cartridge heater 3, 4, to a specific temperature depending on the material which is to be welded.

To allow the mouth of the bag to be introduced between the sealing jaws 1, 2, these are secured to arms 5, 6 which are pivotable in pincers fashion at a fulcrum 24. Mounted for pivoting about the same fulcrum 24 on arms 7, 8, are clamping jaws 9, 10 which firmly grip the mouth of the bag directly above and below the sealing jaws, i.e., the ultimate sealing seam. For this purpose, each of these clamping jaws 9, 10 has a slot through which the sealing jaws 1, 2 can pass.

Strips 14 of woven glass fibres coated with tetrafluoroethylene or the like are secured on the mutually confronting sides of the clamping jaws 9, 10 by means of screws 12 and bars 13, so that the strips mask the sealing surfaces of the sealing jaws 1, 2 from the material to be welded, thereby to prevent any sticking. The strips 14 are held under tension by means of springs 25 and bars 26.

The clamping jaws 9, 10 and sealing jaws 1, 2 are operated together. However, when these jaws are moved together the clamping jaws 9, 10 are the first to bear against the material which is to be welded. This is brought about by springs 15, 16 arranged between the arms 5 and 7, and 6 and 8, respectively. Moreover this arrangement allows the seam to be kept under stress until it sets, after the welding of the mouth of the bag, in that the sealing jaws 1, 2 are first retracted a small amount with the clamping jaws 9, 10, with strips 14, still applying pressure against the seam under the action of the springs 15, 16. When the seam is set, the arms 5, 6 are opened further apart and the arms 7, 8 carrying the clamping jaws 9, 10 also parted. For the latter purpose a link 18 having a longitudinal hole 17 is attached to the arms 5, 6, with pins 19 on the arms 7, 8 projecting into this hole 17.

To accelerate the cooling and setting of the seam after the welding operation, channels 20 and a number of nozzles 21 are provided in the clamping jaws 9, 10, and cooling air, introduced through a conduit 22, is blown through these nozzles against the seam. To control the cooling air, a rockable flap 23 is arranged in front of the discharge orifices of the nozzles 21 in each clamping jaw 9, 10, this flap being located in the path of the respective sealing jaw 1 or 2 and being operated by the latter, so that it covers the discharge orifices of the nozzles 21 during the sealing and subsequently opens them to allow for cooling of the seam.

Finally, it is to be noted that, instead of using the strips of tetrafluoroethylene which are referred to above, use may instead be made of strips of glass fibre fabric impregnated with silicon rubber.

We claim:

1. Heat sealing apparatus comprising a movable sealing jaw with a leading sealing face, means for heating said sealing jaws, a counter member co-operating with said sealing jaw to grip thermoplastic sheet material to be sealed, a clamping jaw movable relatively to said sealing jaw and formed to engage the thermoplastic sheet material at the two sides of said sealing jaw, means for moving said sealing jaw and said clamping jaw respectively into engagement with, and away from, the thermoplastic sheet material, said means being arranged to retract said sealing jaw prior to the retraction of the clamping jaw, at least one weld-cooling nozzle on said clamping jaw, means defining a supply of cooling air to said nozzle, and means controlling the operation of said nozzle in response to relative motion between the sealing jaw and the clamping jaw.

2. Heat sealing apparatus comprising a pair of pincers-pivoted sealing jaws, means for heating said sealing jaws, means for pivoting said sealing jaws together and apart respectively to bite and release thermoplastic sheet material between them, a pair of pincers-pivoted clamping jaws movable relatively to said sealing jaws and adapted to grip and release the thermoplastic sheet material adjacent the bite of said sealing jaws, coverings of heat-transmitting and non-adherent material on the working faces of said clamping jaws and interposed between said sealing jaws, transmission means operatively connecting said sealing jaws and said clamping jaws for simultaneous initial closing movement of said sealing jaws and said clamping jaws, and a lost-motion coupling between said sealing jaws and said clamping jaws to transmit an opening movement of the sealing jaws to the clamping jaws with a delay.

3. Heat sealing apparatus as claimed in claim 2, in which the said coverings are strips of tetrafluoroethylene which are anchored to the respective clamping jaws and are tautened thereon by spring means.

4. Heat sealing apparatus comprising a pair of sealing jaws carried by a pair of arms pivotable about a fulcrum, means in said jaws for continuously heating the same, a pair of clamping jaws mounted on arms pivoted about the fulcrum of the sealing jaw arms, each said clamping jaw having an opening therein to receive one of said sealing jaws, a strip of a non-adherent, heat-transmitting material secured to each said clamping jaw at the working face thereof and covering the said opening therein, transmission means operatively connecting said sealing jaws and said clamping jaws for simultaneous initial closing movement of said sealing jaws and said clamping jaws, and a lost-motion coupling between said sealing jaws and said clamping jaws to transmit an opening movement of the sealing jaws to the clamping jaws with a delay.

5. Heat sealing apparatus comprising a pair of sealing jaws carried by a pair of arms pivotable about a fulcrum, means in said jaws for continuously heating the same, a pair of clamping jaws mounted on arms pivoted about the fulcrum of the sealing jaw arms, each said clamping jaw having an opening therein to receive one of said sealing jaws, a strip of non-adherent, heat-transmitting material secured to each said clamping jaw at the working face thereof and covering the said opening therein, spring means engaged between each corresponding clamping jaw arm and sealing jaw arm to transmit the closing movement of the latter to the former and allow initial opening movement of this sealing jaw arm without opening movement of the clamping jaw arm, and a link on each sealing jaw having an elongated slot receiving a coupling pin on the corresponding clamping jaw.

6. Heat sealing apparatus as claimed in claim 4, in which each clamping jaw has therein at least one nozzle directed towards the sealing-jaw-receiving opening, means defining a supply of cooling air to said nozzle, and means for opening and closing this nozzle in response to relative movement between this clamping jaw and the corresponding sealing jaw.

7. Heat sealing apparatus comprising a pair of sealing jaws carried by a pair of arms pivotable about a fulcrum, means in said jaws for continuously heating the same, a pair of clamping jaws mounted on arms pivoted about the fulcrum of the sealing jaw arms, each said clamping jaw having an opening therein to receive one of said sealing jaws, each clamping jaw having therein at least one nozzle directed toward the sealing-jaw-receiving opening, a flap for controlling the opening and closing of said nozzle, said flap pivotally mounted and positioned in the opening in said clamping jaw in the path of relative movement of the corresponding sealing jaw, a strip of a non-adherent, heat-transmitting material secured to each said clamping jaw at the working face thereof and covering the said opening therein, transmission means to impart the closing movement of said sealing jaws to said clamping jaws, and a lost-motion coupling between said sealing jaws and said clamping jaws to transmit an opening movement of the sealing jaws to the clamping jaws with a delay.

References Cited in the file of this patent

UNITED STATES PATENTS

| | | |
|---|---|---|
| 2,638,964 | Andina | May 19, 1953 |
| 3,015,600 | Cook | Jan. 2, 1962 |
| 3,017,314 | Kebekus et al. | Jan. 16, 1962 |
| 3,063,890 | Saumsiegle | Nov. 13, 1962 |